US009513777B1

(12) United States Patent
Chung et al.

(10) Patent No.: US 9,513,777 B1
(45) Date of Patent: Dec. 6, 2016

(54) SUPPLEMENTING UNSUBSCRIBED ITEMS IN AN ACTIVITY STREAM

(71) Applicant: Google Inc., Mountain View, CA (US)

(72) Inventors: Irene Chung, Mountain View, CA (US); Xiaomi Sun, San Mateo, CA (US); Jonathan Terleski, Mountain View, CA (US)

(73) Assignee: Google Inc., Mountain View, CA (US)

( * ) Notice: Subject to any disclaimer, the term of this patent is extended or adjusted under 35 U.S.C. 154(b) by 396 days.

(21) Appl. No.: 13/756,426

(22) Filed: Jan. 31, 2013

Related U.S. Application Data

(60) Provisional application No. 61/593,289, filed on Jan. 31, 2012.

(51) Int. Cl.
*G06F 3/048* (2013.01)
*G06F 17/30* (2006.01)
*G06F 3/00* (2006.01)
*G06F 3/0484* (2013.01)

(52) U.S. Cl.
CPC .................................. *G06F 3/0484* (2013.01)

(58) Field of Classification Search
CPC ........... G06F 3/048; G06F 17/30; G06F 3/00; G06Q 50/01; H04L 51/32
USPC .......................................................... 715/772
See application file for complete search history.

(56) References Cited

U.S. PATENT DOCUMENTS 7,669,123 B2 * 2/2010 Zuckerberg et al. ......... 715/273
8,180,804 B1 * 5/2012 Narayanan ........ G06F 17/30867 707/798
8,478,895 B2 * 7/2013 Zhang ........................... 709/236
D691,622 S * 10/2013 Shaffer ........................ D14/486
8,751,538 B1 * 6/2014 Wheeler et al. ............. 707/791
8,825,729 B1 * 9/2014 Cope ..................... G06F 17/142 708/404
2008/0071929 A1 * 3/2008 Motte et al. ................. 709/246
2008/0091723 A1 * 4/2008 Zuckerberg et al. ...... 707/104.1
2009/0144392 A1 * 6/2009 Wang et al. .................. 709/217
2009/0216840 A1 * 8/2009 Pajunen et al. ............... 709/206
2010/0318571 A1 * 12/2010 Pearlman et al. ............ 707/784
2011/0083069 A1 * 4/2011 Paul et al. .................... 715/234
2011/0191363 A1 * 8/2011 Bell ........................ G06F 17/21 707/767
2011/0276396 A1 * 11/2011 Rathod ...................... 705/14.49
2012/0054666 A1 * 3/2012 Baird-Smith .......... G06Q 10/10 715/780
2012/0166964 A1 * 6/2012 Tseng ............................ 715/745
2012/0254097 A1 * 10/2012 Flinn ........................ G06N 7/02 706/52
2013/0030905 A1 * 1/2013 Fuloria et al. ............ 705/14.39

(Continued)

*Primary Examiner* — Jennifer To
*Assistant Examiner* — Hugo Molina
(74) *Attorney, Agent, or Firm* — McDermott Will & Emery LLP

(57) ABSTRACT

A system for supplementing items in an activity stream provides an item for display in an activity stream on a client device. The system also generates an interactive element based on a type of the client device, where the interactive element includes context information about the item. The system also arranges a user selectable control within the interactive element based on a type of the item, where the user selectable control is configured to initiate a response to the item. The system also provides the interactive element for display in association with the item in the activity stream on the client device.

18 Claims, 10 Drawing Sheets

404 450
RECOMMENDED POST - CURRENTLY RECOMMENDED
402
404 412
RECOMMENDED POST - CURRENTLY RECOMMENDED
402
TIM DOE
CARTOONIST, AUTHOR, COOL GUY
ADD TIM
408 406 451 410

404 452
RECOMMENDED POST - JANE DOE HAS ADDED TIM DOE
402
404 412
RECOMMENDED POST - JANE DOE HAS ADDED TIM DOE
TIM DOE
CARTOONIST, AUTHOR, COOL GUY
ADD TIM
408 406 410 453

(56) References Cited

U.S. PATENT DOCUMENTS

2013/0031487 A1* 1/2013 Olsen ..................... G06Q 50/01 715/751
2013/0151539 A1* 6/2013 Shi .................... G06F 17/30867 707/754
2014/0129942 A1* 5/2014 Rathod ......................... 715/720

* cited by examiner 100
112
114
108
110
NETWORK
104
106
118
102
116
120

SUPPLEMENTING UNSUBSCRIBED ITEMS IN AN ACTIVITY STREAM

CROSS-REFERENCE TO RELATED APPLICATIONS

The present application claims the benefit of U.S. Provisional Patent Application Ser. No. 61/593,289, entitled "Supplementing Unsubscribed Items in an Activity Stream," filed on Jan. 31, 2012, which is hereby incorporated by reference in its entirety for all purposes.

BACKGROUND

The subject technology generally relates to displaying items in an activity stream, and, in particular, relates to systems and methods for supplementing items displayed in a user's activity stream.

A social network user may receive items which are displayed in the user's activity stream without knowing why such items are displayed in the user's activity stream. The user's lack of knowing why an item is relevant may cause the user to be overwhelmed by a user activity stream filled with items the user may or may not have subscribed to.

SUMMARY

The disclosed subject matter relates to a computer-implemented method including providing an item displayed in an activity stream on a client device. The method further includes generating an interactive element based on the item, where the interactive element includes context information about the item. The method further includes arranging a user selectable control within the interactive element based on a type of the item, where the user selectable control is configured to initiate a response to the item. The method also includes providing the interactive element for display in association with the item in the activity stream on the client device. These and other aspects can be provided in corresponding systems and apparatus, including computer program products.

These and other aspects can include one or more of the following features. The item may include a news post, an image, a video, or a social network user activity post. Context information about the item may include a summary of social network activity related to the item. Context information about the item may also include information about a source of the item. Context information about the item may also include social network user comments about the item.

A response to the item may include adding a source of the item to the user's social network. Another response to the item may include sharing the item with another social network user. Another response to the item may include removing the item from the activity stream.

An interactive element may also be configured to expand from a contracted state in response to a user action and provide additional context information. The interactive element may be further configured to display the user selectable control in the expanded state. The type of client device may include a mobile device and a desktop computer.

The method may further include providing multiple items for display in the activity stream, where multiple interactive elements are generated for display in association with the multiple items, respectively, and the interactive elements are provided for display in association with the multiple items in the activity stream.

The disclosed subject matter also relates to a machine-readable medium storing machine-executable instructions, which when executed by a machine, cause the machine to perform operations including providing an item displayed in an activity stream on a client device. The instructions also include code which when executed by a machine, cause the machine to perform operations including determining a type of device on which the activity stream is displayed on. The instructions also include code which when executed by a machine, cause the machine to perform operations including generating an interactive element based on the type of client device, where the interactive element includes context information about the item and is configured to expand from a contracted state to an expanded state in response to a user action and provide additional context information. The instructions also include code which when executed by a machine, cause the machine to perform operations including arranging a user selectable control within the interactive element based on a type of the item, where the user selectable control is configured to initiate a response to the item. The instructions also include code which when executed by a machine, cause the machine to perform operations including providing the interactive element for display in association with the item in the activity stream on the client device. These and other aspects can be provided in corresponding systems and apparatus, including computer program products.

These and other aspects can include one or more of the following features. Context information about the item may include a summary of social network activity related to the item. Context information about the item may also include information about a source of the item. Context information about the item may also include social network user comments about the item.

A response to the item may include adding a source of the item to the user's social network. Another response to the item may include sharing the item with another social network user. Another response to the item may include removing the item from the activity stream.

The machine-readable medium may further provide multiple items for display in the activity stream, where multiple interactive elements are generated for display in association with the multiple items, respectively, and the interactive elements are provided for display in association with the multiple items in the activity stream.

The disclosed subject matter also relates to a system including a memory storing executable instructions and one or more processors configured to execute the executable instructions stored in the memory, which when executed by the processors, cause the processors to provide an item for display in an activity stream on a client device. The system also includes one or more processors configured to execute the executable instructions stored in the memory, which when executed by the processors, cause the processors to generate an interactive element based on a type of the client device, where the interactive element includes context information about the item and is configured to expand from a contracted state to an expanded state in response. The system also includes one or more processors configured to execute the executable instructions stored in the memory, which when executed by the processors, cause the processors to arrange a user selectable control within the interactive element based on a type of the item, wherein the user selectable control is configured to initiate a response to the item. The system also includes one or more processors configured to executed the executable instructions store in memory, which when executed by the processors, cause the processors to provide the interactive element for display in association with the item in the activity stream on the client device. These and other aspects can be provided in corresponding systems and apparatus, including computer program products.

These and other features of the subject technology may provide one or more of the following advantages. Interactive elements generated based on a type of client device may make more effective use of the display size and capabilities of the client device. Controls arranged in the interactive elements may allow users to more quickly and effectively interact with items in an activity stream. Context information about items in an activity stream may allow users to more quickly filter items of interest in the activity stream.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
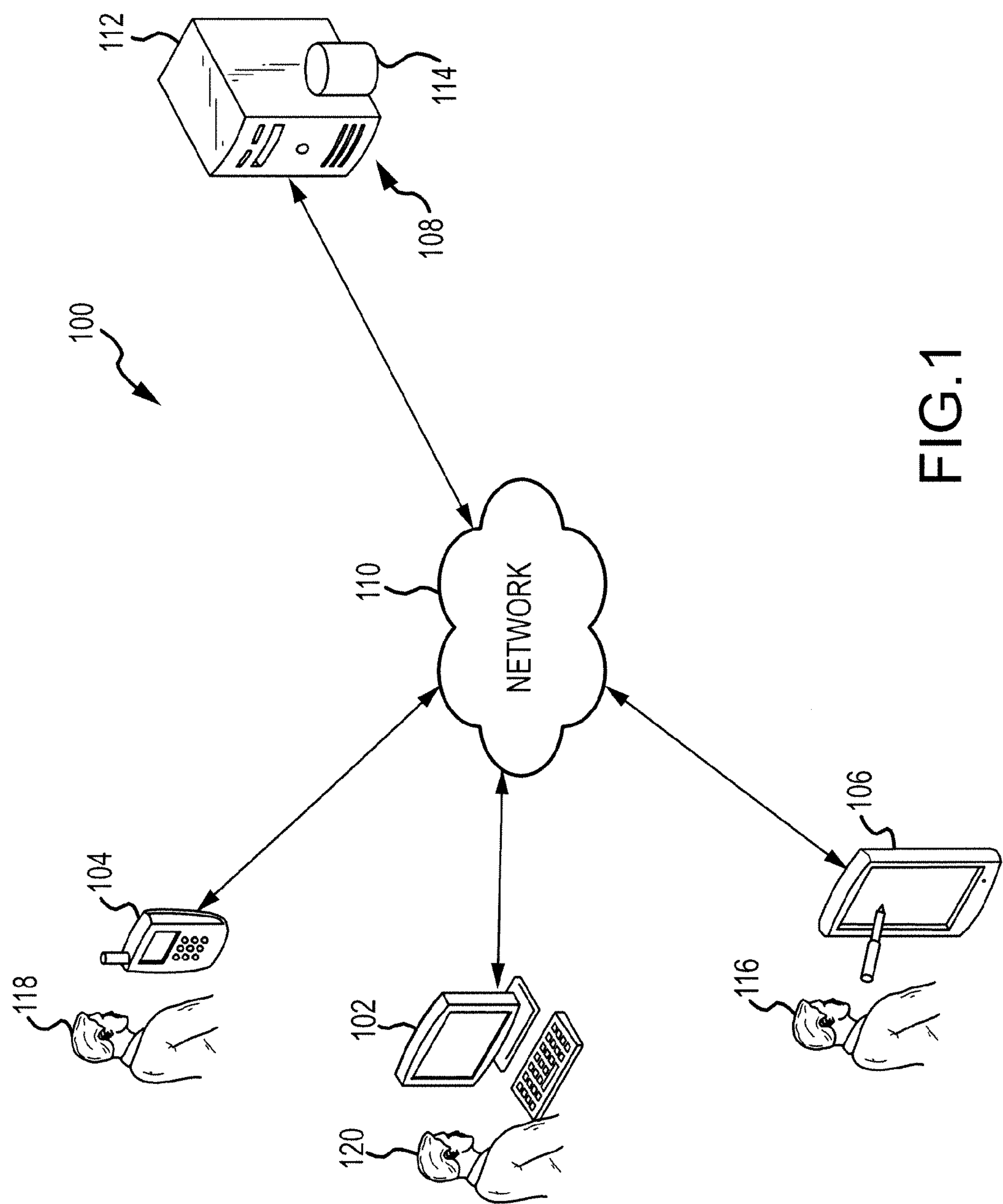
FIG. 1 illustrates an example client-server network environment for providing items for display on one or more client devices, in accordance with various aspects of the subject technology.

The detailed description set forth below is intended as a description of various configurations of the subject technology and is not intended to represent the only configurations in which the subject technology may be practiced. It will be apparent, however, that the subject technology is not limited to the specific details set forth herein and may be practiced without these specific details.

In accordance with the subject disclosure, a system and a method are provided for supplementing items displayed in a user's activity stream. The system provides a framework for assembling interactive elements, which are provided for display in an activity stream. The assembling of an interactive element may be based on a type of the item and/or a type of the client device the interactive element is displayed on. For example, the framework may vary the extensibility of the interactive element and the amount of context information provided by the interactive element based on the type of the client device the interactive element is displayed on. Alternatively, the framework may customize the interactive element with one or more user selectable controls based on the type of the item associated with the interactive element, where the different selectable controls are configured to provide different types of user responses to the interactive element.

An item may include, but is not limited to, a news post, an image, a video, a social network user activity post, a recommendation by a social network server, a recommendation by one or more social network users, a social network user outside of a user's social graph that associates another social network user within the user's social graph with a news post, an image, a video, or a social network user activity, a comment by a social network user within the user's social graph regarding a social network user activity post by another social network user outside of the user's social graph, an addition of a social network user or social network page by one or more social network users within the user's social graph, a social network user within the user's social graph sharing multiple user activity posts with the user, and the like.

Multiple interactive elements that contain different context information about the item may be generated and provided for display in an activity stream on a client device. The amount of context information included in an interactive element for the item may be based at least in part on the type of client device that the interactive element is to be displayed on. Context information can include information about the source of the item and/or an explanation on why the item was displayed in the activity stream.

The interactive element may also include one or more user selectable controls. The one or more user selectable controls may be arranged within the interactive element based on a type of the item. The one or more user selectable controls may include, but are not limited to, adding a source of the item to a user's social graph, sharing the item with another social network user, removing the item from the user's activity stream, and recommending the item to another social network user. The one or more user selectable controls may also be configured to allow an expansion of an interactive element. If an interactive element displays a summary of an item, the user selectable control may allow one or more levels of expansion of the summary until the entire description of the item is displayed in a user's activity stream.

An interactive element based on the item may contain multiple user selectable controls configured to initiate different responses to the item. A news post item may contain a user selectable control configured to expand the content of the news post and a user selectable control configured to initiate a user response to recommend the news post to other users. Additional examples of items containing multiple user selectable controls are shown in FIGS. 4A-4I and are discussed elsewhere in the specification. Other examples of items containing multiple user selectable controls beyond the ones discussed in the specification may be implemented based on the type of the item and context information about the item.

The interactive element is provided for display in association with the item in the activity stream on the client device. Examples of an "activity stream" include, but are not limited to, a list, a compilation, or a collection of one or more items that are generated by the social network and provided for display on the user's client device. A web browser application or a client application running on a client device may provide a user interface for displaying the activity stream. The activity stream may be displayed anywhere with respect to the user interface containing the activity stream. Items displayed in an activity stream may be displayed in an order designated by the user or the system.

The user may indicate types of content items that the user would like to be displayed in or removed from the user's activity stream. In one example, the user may indicate that the user would like to receive image based content items in the user's activity stream but remove video feeds from the user's activity stream. The user may indicate specific content items that the user would like to be displayed in or removed from the user's activity stream. For example, the user may elect to receive content items associated with and/or posted by another social network user who is within the user's social graph but not receive content items associated with and/or posted by a third social network user who is not within the user's social graph. The system can also make similar decisions based on a combination of user settings and prior user behavior. For example, if the user has selected a content item that is associated with and/or posted by the third social network user for more than a threshold number of times, then the system may elect to populate the user's activity stream with content items associate with and/or posted by the third social network user even if the posted content times have not been selected by the user of the social network.

The system may continuously update the user's activity stream with items and associated interactive elements. The system may also provide items and the interactive elements to multiple users' activity streams. The system may preserve a user's response to an interactive element based on an item and transmit the response to the network. The system may store the response to preserve the user's preferences, e.g., a user's response to remove the item may prevent a subsequent display of the item in the user's activity stream. As the user continues to respond to items in user's activity stream, the system will become more tailored to providing the user with items the user is more likely to be interested in.

The system provides a framework to assemble an interactive element. The framework may determine a type of the user's client device, and generate, based on the type of the client device, an interactive element for display to accommodate the hardware specification of the type of client device as well as the dimensions of the client device's display screen. The framework may vary the size of the interactive element based on the type of the client device. The framework may also provide one or more user selectable controls based on the type of the client device. The framework may position the location of the one or more user selectable controls with respect to the interactive element based on the type of the client device the interactive element is displayed on. The framework may also vary the extensibility of the interactive element based on the type of the client device. For example, the system may generate two interactive elements based on a single social network activity post, the first interactive element to be displayed on a desktop computer and the second interactive element to be displayed on a smartphone. The two generated interactive elements may have different dimensions, context information, and user selectable controls. The generated interactive element for display on a desktop computer may have larger dimensions, may have a higher pixel density and may be unsuitable or impossible to display on a smartphone. Whereas the generated interactive element for a display on a smartphone may have smaller dimensions to accommodate for the size of the smartphone's display screen, and may have a lower pixel density to account for the smartphone's processor speed as well as a longer transmission time.

The system may also determine a type of item it is based on and assemble an interactive element based on the type of the item. The framework may vary the types of user selectable controls provided to the interactive element based on the type of the item. For example, an interactive element for an item for a post by a user who is outside of the user's social graph may include a user selectable control for the user to add the outside user to the user's social graph. The framework may also vary the extensibility of the interactive element based on the type of the item associated with the interactive element. For example, an interactive element that includes a news post may expanded to show content of the news post.

The system may also determine a type of software used to display an activity stream on a client device (e.g., whether a client application or a type of web browser application). The system may generate one or more interactive elements based on a single item to ensure the interactive element is compatible with the type of software used. Therefore, the system is capable of generating different interactive elements based on a single item to provide the user with a more optimized viewing experience or in some instances makes it possible for the user to view an item.

FIG. 1 illustrates an example client-server network environment for providing items for display on one or more client devices. A network environment 100 includes one or more client devices 102, 104, and 106 communicably connected to server 108 by a network 110. Server 108 may include one or more actual servers and is hereafter referred to as server or the server. The network 110 can be a public communication network (e.g., the Internet, cellular data network, dialup modems over a telephone network) or a private communications network (e.g., private LAN, leased lines). Furthermore, the network 110 can include, but is not limited to, any one or more of the following network topologies, including a bus network, a star network, a ring network, a mesh network, a star-bus network, a tree or hierarchical network, and the like.

Client devices 102, 104, and 106 may be, but are not limited to, for example, mobile computers, tablet computers, mobile devices (e.g., a smartphone or PDA), desktop computers, set top boxes (e.g., for a television), video game consoles, or any other devices having processing capabilities, communications capabilities, and memory. Additional types of client devices may include any type of client device with hardware and software to receive one or more interactive elements based on one or more items from server 108 and to provide the one or more interactive elements based on the one or more items for display in an activity stream. In the example of FIG. 1, client device 102 is depicted as a desktop computer, client device 104 is depicted as a smartphone, and client device 106 is depicted as a tablet computer.

Server 108, may include a processing device 112 and a data store 114. Processing device 112 may be configured to execute computer instructions to facilitate supplementing items associated with users interacting with client devices 102, 104, or 106. Computer instructions may be stored in data store 114, one or more storage mediums within server 108, or any other data store accessible to the system. Server 108 may be capable of generation and maintenance of items.

The server 108 may also represent more than one computing device working together to perform the actions of a server computer (e.g., cloud computing). In some examples, server 108 may be coupled with various databases or storage services. Communications between the client devices 102, 104, and 106, and server 108 may be facilitated through the HTTP communication protocol. Other communication protocols may also be facilitated including e.g., XMPP communication, for some or all communications between the client devices 102, 104, and 106 and server 108.

Users 116, 118, and 120 may interact with the system and one or more social networking sites hosted by server 108, through a client application running on the client devices 102, 104, and 106. A client application may include any software designed to connect client devices 102, 104, and 106 to the system. Users may also interact with the system or one or more social networking sites hosted by server 108, through a web browser application running on the client devices 102, 104, and 106. Communication between client devices 102, 104, and 106 and the system may be facilitated through the network 110.

Items may be stored within a data store 114 accessible by the system or on the server 108. The system may provide multiple items and display each of the items in an activity stream. The system provides a framework for assembling interactive elements. The system may generate one or more interactive elements based on a type of client device the interactive element is provided for display on and/or based on a type of the item, where the interactive element includes context information about the item.

Context information about an item provides information about the source of the item and/or an explanation on why the item was displayed in the activity stream. Context information may include, but is not limited to, a summary of the social network activity related to the item, information about the source of the item, a graphical representation of the source of the item, one or more social network users' comments about the item, a numerical representation of the number of social network users who responded to the item, and/or a user's relation to other social network users who responded to the item. Where an interactive element based on the item displays only a summary regarding the item, or where an item's entire context information is not provided, the user selectable control may be configured to allow the interactive element to expand from a contracted state in response to a user action to provide additional context information about the item.

An interactive element also includes one or more user selective controls based on a type of the item. The user selectable controls may be configured to allow the user to initiate a response to the item. Examples of user responses include, but are not limited to, adding the source of the item to the user's social network, sharing the item with one or more social network users, recommending the item, removing the item from the user's activity stream, or another response mentioned elsewhere in the specification.

The system may further determine a type of device an activity stream is displayed on (e.g., whether the device is a desktop computer 102, smartphone 104, a tablet computer 106 or another client device). The system may generate one or more interactive elements based on a single item to accommodate for the hardware specification of the device and screen size of the device.

The system 108 may also determine a type of software used to display an activity stream on a client device 102, 104, or 106 (e.g., whether a client application or a type of web browser application). The system may generate one or more interactive elements based on a single item to ensure the interactive element is compatible with the type of software used.

The system 108, upon generating an interactive element and arranging one or more user selectable controls within the interactive element, provides the interactive element via the network 110, for display in association with the item in an activity stream on the client device.

Figure 2:
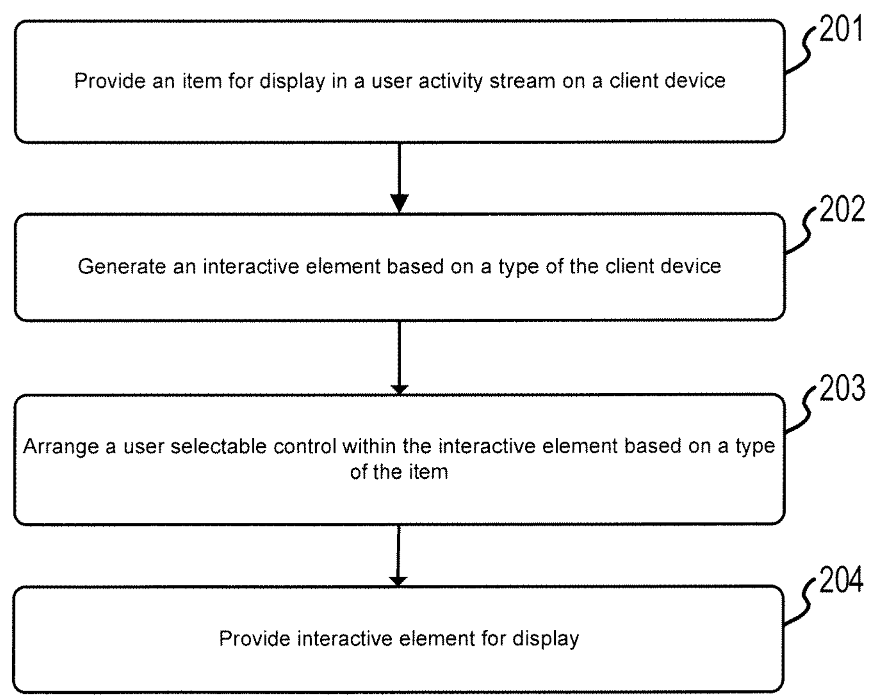
FIG. 2 illustrates an example of a method for generating an item for display in an activity stream, in accordance with various aspects of the subject technology.

FIG. 2 illustrates an example process for supplementing an item for display in an activity stream, in accordance with various aspects of the subject technology. Although the operations in this process are shown in a particular order, certain operations may be performed in different orders or at the same time. According to one aspect, an item may be stored in a data store, a storage medium within a server, or any other database accessible to the system. The item may be, but is not limited to, a news post, an image, a video, a social network user activity post or any other item mentioned elsewhere in the specification. The item may be transmitted from its storage location (e.g., a data store) through the network to the server. The item may also be stored locally on the server.

The server elects to provide the item for display in an activity stream on a client device in block 201. The source of the items may be another user or entity who/which is not part of the user's current contacts or social network groupings. Algorithms may be configured based on the user's prior actions on the social network, the user's personal settings, the user's contacts, etc., to identify items the user is and/or may be interest in. The items may also be ranked based on information related to the user and apply a threshold to the rankings to identify which items to provide for display in the user's social activity stream. The items may include one or more items the user previously was interested in.

The server generates an interactive element based on a type of the client device, where the interactive element includes context information about the item in block 202. The type of client device may include a mobile device and a desktop. Additional types of client devices may include other types client devices disclosed herein. The generated interactive element may include context information about the source of the item and/or an explanation on why the item was displayed in the activity stream. Context information about the item may contain, but is not limited to, information about a news post, a summary of social network activity related to the item, a social network user's comments about the item, or any other description mentioned elsewhere in the specification. Where an interactive element based on the item displays only a summary of the item, or where an item's entire context information is not provided, the interactive element is configured to expand from a contracted state in response to a user action to provide additional context information about the item. The interactive element may be further configured to display the user selectable control in the expanded state. The server may also generate an interactive element based on a type of software running on the client device that is used to provide the interactive element for display.

The server arranges a user selectable control within the interactive element based on a type of the item, where the user selectable control is configured to initiate a response to the item in block 203. A news post item may include context information about the news post, a user selectable control configured to expand the content of the news post and a user selectable control configured to initiate a user response to recommend the news post to other users. Whereas, an item related to a recommendation by one or more social network users may include context information about the social network users who made the recommendation and a user selectable control configured to initiate a response to add one or more of the social network users who made the recommendation to the user's social graph. Interactive elements may be customized beyond the examples noted above to allow the source of the item or the system to provide different types of context information and/or different types of user selectable controls for user responses to the items. The interactive element may include multiple user selectable controls, and the server may arrange each of the multiple user selectable controls within the interactive element. The user selectable control of the interactive element may include, but is not limited to, allowing a user to respond to the item by adding a source of the item to the user's social network, sharing the item with one or more social network users, removing the item from the user's activity stream, or another response mentioned elsewhere in the specification.

The interactive element may also include multiple user activity posts. Where multiple user activity posts are represented by a single interactive element, the interactive element may display some of the activity posts and give the user an option to view all of the activity posts. The user selectable control may be configured to allow the user to expand the list of user activity posts represented by the interactive element to view all of the user activity posts associated with the item. An expansion of an interactive element may be triggered in a number of ways. An expansion of an interactive element presented on a display may be triggered by a selection or indication e.g., a mouse click, or a hover action. Where an expansion of an interactive element is triggered in response to a hover action, a delay may be introduced to prevent the item from instantly expanding in response to a mouse scrolling above the interactive element. An expansion of an interactive element displayed on a mobile device, for example, a smartphone, tablet computer or a PDA may be triggered by tapping an area of the display screen where the interactive element is displayed.

The server provides the generated interactive element for display in association with the item in the user's activity stream on the client device in block 204. Where multiple items are displayed on a user's client device 102, 104, or 106, the items are provided by the system for display in the user's activity stream, multiple interactive elements are generated for display in association with the items, respectively, the interactive elements are provided for display in association with the plurality of items in the user's activity stream.

Figure 3A:
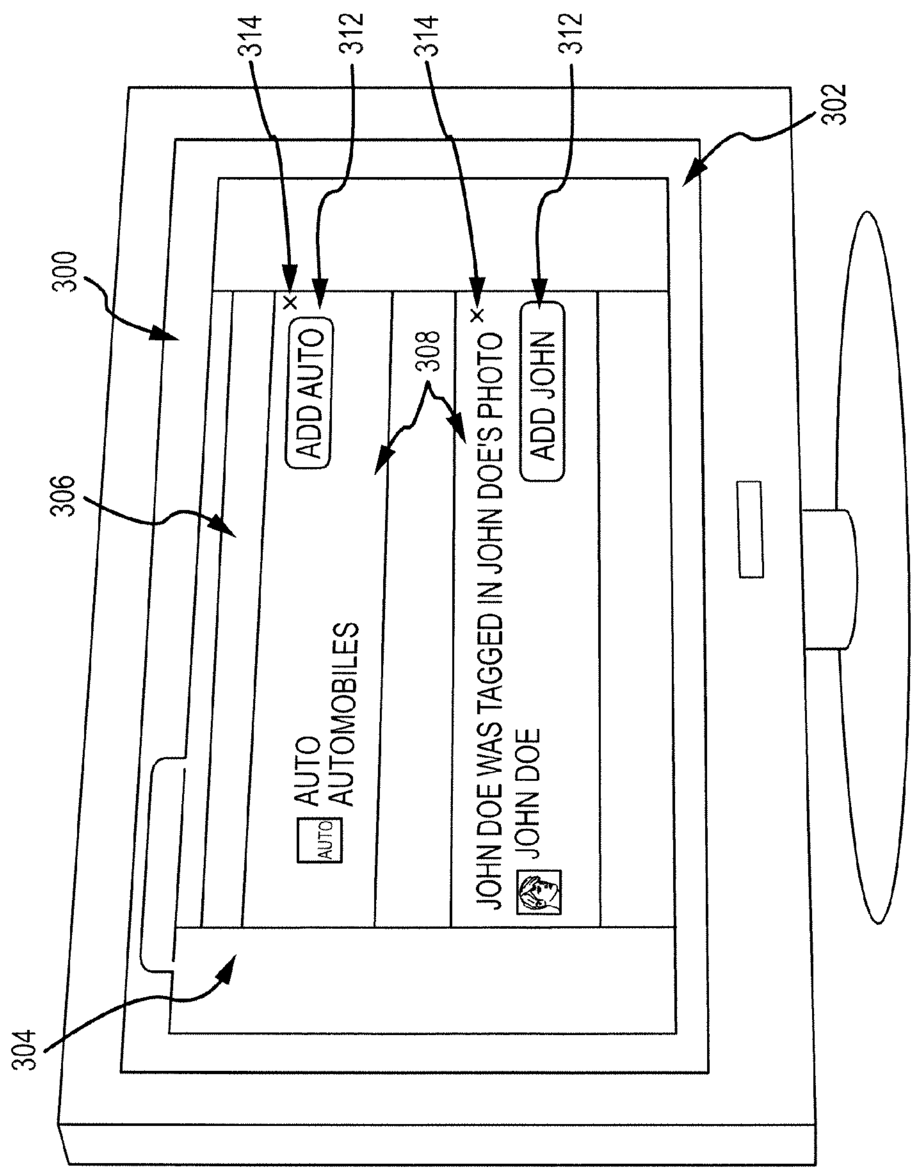
FIG. 3A illustrates an example graphical user interface for displaying an activity stream on a desktop computer device, in accordance with various aspects of the subject technology.

FIG. 3A illustrates an example graphical user interface for displaying an activity stream on a desktop computer, in accordance with various aspects of the subject technology. Desktop computer device screen 300 displays a web browser application 302 running on the desktop computer. Once the user is connected to the server and the user's social network page 304 is loaded, the user's social network activity stream 306 is displayed within the social network page 304. The user's activity stream 306 is not limited to the location of the activity stream with respect to the social network page 304 as shown in FIG. 3A. The system may supplement one or more items 308 in the user's activity stream 306. Location of an item with respect to other items in the user's activity stream is not limited to the locations shown in FIG. 3A and may appear anywhere in the user's activity stream. The user may respond to items 308 displayed in the user's activity stream 306 by interacting with the item's user selectable control 312-314. The user may respond to the item by adding the source of the item to the user's social network, sharing the item with one or more social network users, recommending the item, removing the item from the user's activity stream, or another response mentioned elsewhere in the specification.

Figure 3B:
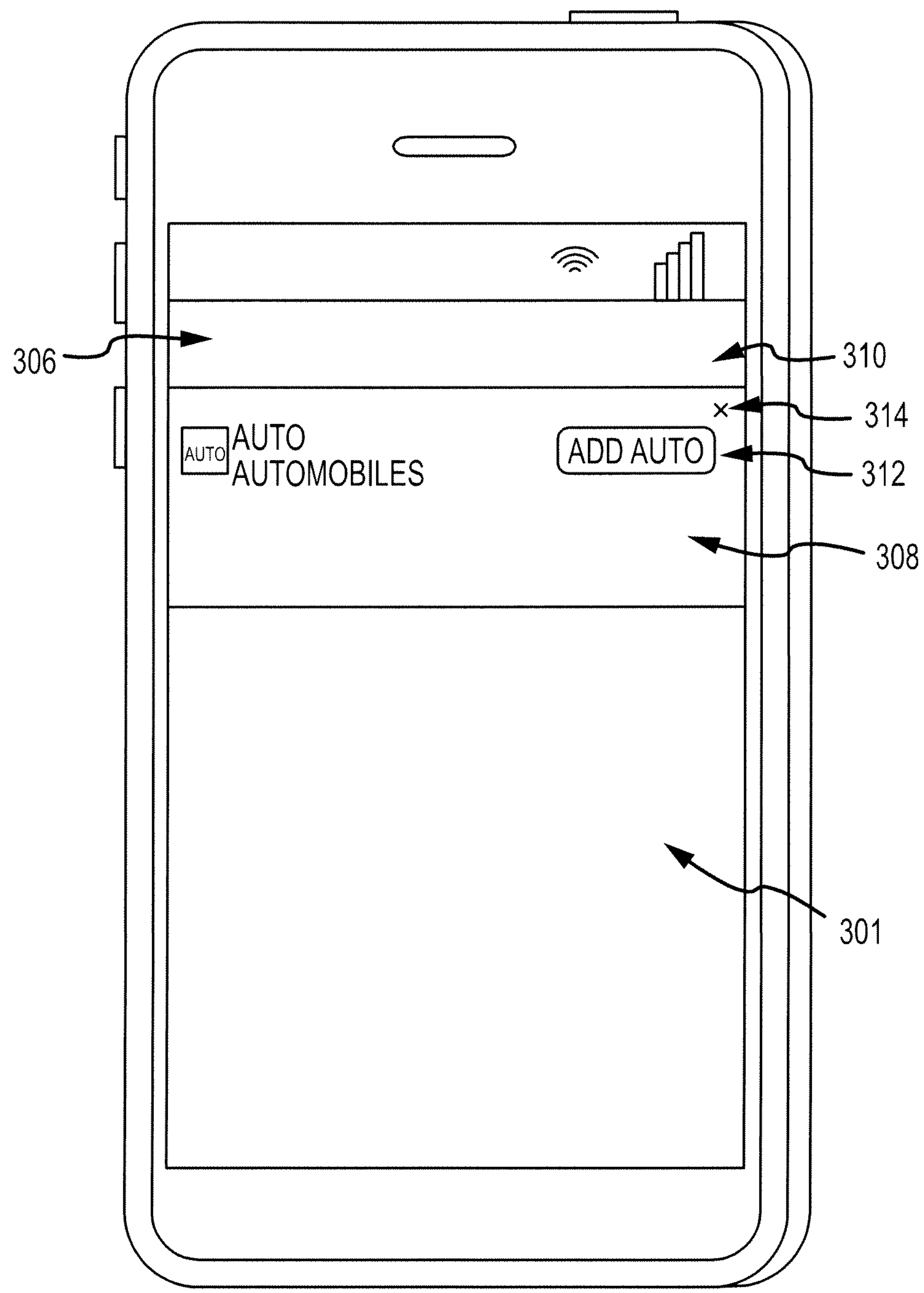
FIG. 3B illustrates an example graphical user interface for displaying an activity stream on a smartphone, in accordance with various aspects of the subject technology.

FIG. 3B illustrates an example graphical user interface for displaying an activity stream on a smartphone, in accordance with various aspects of the subject technology. The smartphone screen 301 displays a client application 310 running on a client device to provide the user with a user interface containing an activity stream. One or more client applications 310 may be used to provide the user with a user interface. Once the user is connected to the server and the client application is loaded, the user's activity stream 306 is displayed by the client application 310. The user's activity stream 306 is not limited to the location of the activity stream with respect to the social network page 304 as shown in FIG. 3B. The system may supplement one or more items 308 in the user's activity stream 306. Location of an item with respect to other items in the user's activity stream is not limited to the locations shown in FIG. 3B and may appear anywhere in the user's activity stream. The user may respond to an items 308 displayed in the user's activity stream 306 by interacting with the item's user selectable control 312-314. The user may respond to the item by adding the source of the item to the user's social network, sharing the item with one or more social network users, recommending the item, removing the item from the user's activity stream, or another response mentioned elsewhere in the specification.

Alternatively, a smartphone user may also connect to the network through a web browser. The web browser may be any web browser running on a client device to provide the user with a user interface containing an activity stream. Once the user is connected to the server and the user's social network page 304 is loaded, the user's social network activity stream 306 is displayed within the social network page 304. The user's activity stream 306 is not limited to the location of the activity stream with respect to the social network page 304 as shown in FIG. 3A. The system may supplement one or more items 308 in the user's activity stream 306. Location of an item with respect to other items in the user's activity stream is not limited to the locations shown in FIG. 3A and may appear anywhere in the user's activity stream. The user may respond to an item 308 displayed in the user's activity stream 306 by interacting with the item's user selectable control 312-314. The user may respond to the item by adding the source of the item to the user's social network, sharing the item with one or more social network users, recommending the item, removing the item from the user's activity stream, or another response mentioned elsewhere in the specification.

Figure 4A:
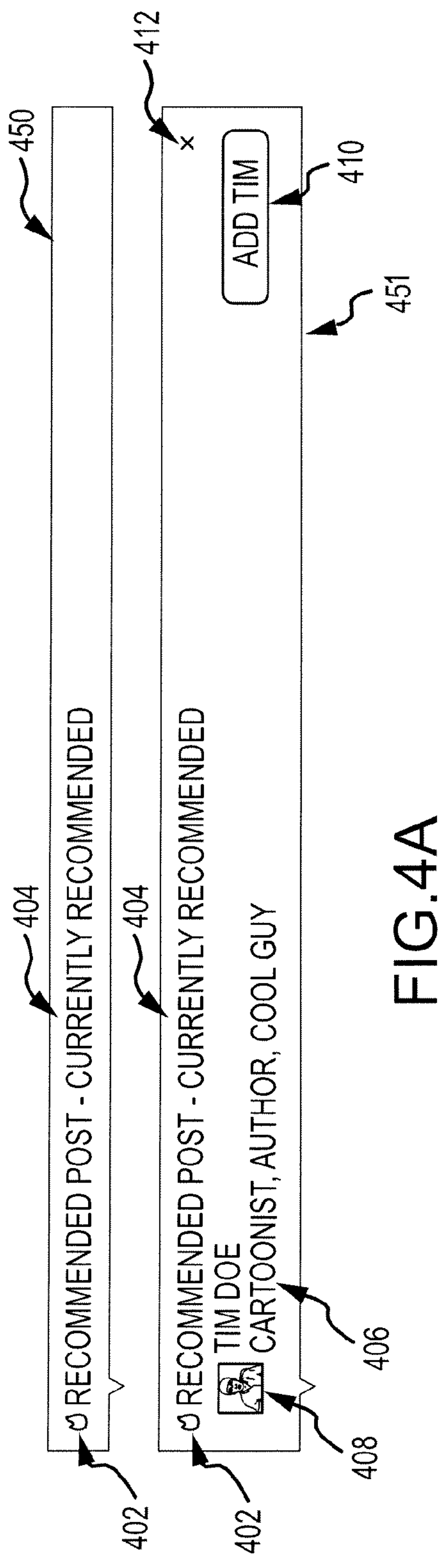
FIGS. 4A-4I illustrate examples of interactive elements, each particular element is based on an item, and each particular element comprising a context information about the item and a user selectable control, in accordance with various aspects of the technology.

FIG. 4A illustrates two examples of interactive elements (450 and 451) that are based on an item recommended by the server and displayed in an activity stream. Interactive element 450 contains an icon 402 representing the item associated with the interactive element and a description of the item and/or an explanation on why the item was displayed in the activity stream 404. Interactive element 451 also contains icon 402 and explanation 404. Interactive element 451 also contains context information about the source of the item 406 and a graphical representation of the source of the item 408. The graphical representation may be a portrait, a profile picture, or any other image representing the source of the item. Alternative examples of this item may or may not include all of the above mentioned features. Interactive element 451 also contains a user selectable control configured to allow adding the source of the item to a user's social network 410 and removal of the item from the user's activity stream 412. The server may generate additional interactive elements based on the item that contain other context information about the item.

Additional context information provided by interactive element 451 also takes up additional space in the user's activity stream, and may require additional time to render, etc. Accordingly, the server uses the type of the user's client device as a factor for determining whether interactive element 450 or 451 is generated and provided for display on the user's client device. For example, if the server determines that the user's client device is a smartphone, then interactive element 450 is generated and inserted into the user's activity stream for display on the smartphone, whereas, if the server determines that the user's client device is a desktop computer, then interactive element 451 is generated and is inserted into the user's activity stream for display on the desktop computer. In another example, the server may generate multiple interactive elements for an item, where the interactive elements contain the same amount of context information but are formatted differently (e.g., an interactive element that is generated for display on a desktop contains borders, background colors, etc., whereas an interactive element that is generated for display on a smartphone contains no border and has no background color, etc.) based on the type of client device the generated interactive element is displayed on.

Figure 4B:
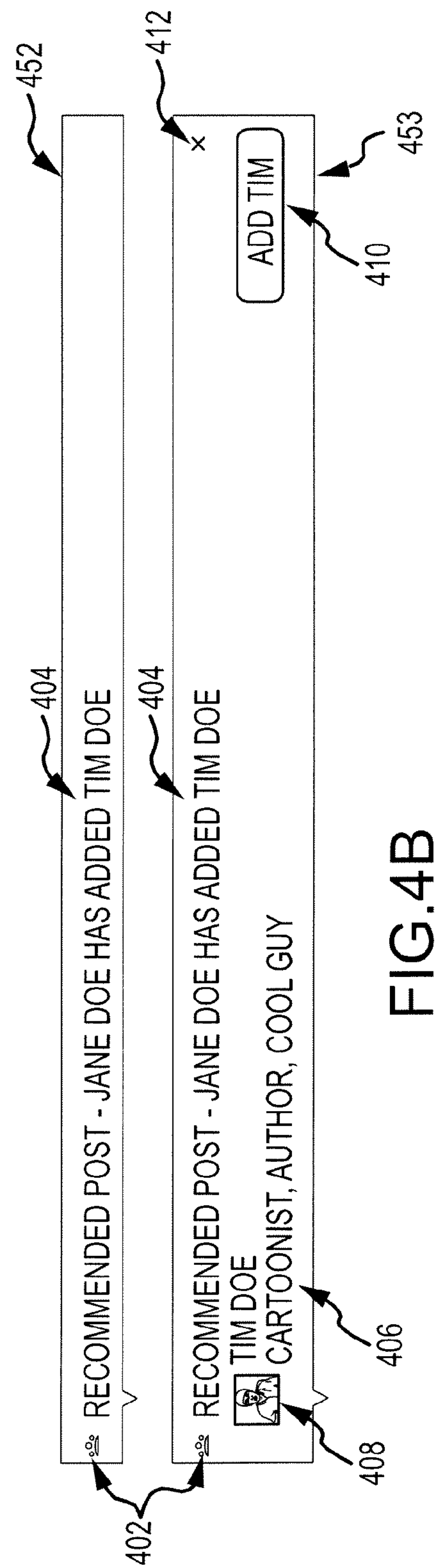

FIG. 4B illustrates two examples of interactive elements (452 and 453) that are based on an unsubscribed item recommended by a social network user within a user's social graph. Additionally, an interactive element may also be based on a subscribed item that is recommended by a social network user within a user's social graph. A "social network user within the user's social graph" and "a social network page within the user's social graph" may be one or more social network users, or one or more social network pages, respectively, whom the user designated to have a greater level of connection with the user in comparison to social network users or social network pages outside of the user's social graph. The user may provide a social network user or a social network page within the user's social graph with additional privileges to access content available to the user or to share additional content with the user. Interactive element 452 contains an icon 402 representing the item associated with the interactive element and a description of the item and/or an explanation on why the item was displayed in the activity stream 404. Interactive element 453 also contains icon 402 and explanation 404. In addition, interactive element 452 also contains context information about the source of the item 406 and a graphical representation of the source of the item 408. The graphical representation may be a portrait, a profile picture, or any other image representing the source of the item. Alternative examples of this item may or may not include all of the above mentioned features. Interactive element 452 also contains a user selectable control configured to allow adding the source of the item to the user's social network 410 and removal of the item from the user's activity stream 412. Additional interactive elements that contain other types of context information about the item may also be generated and provided to the user's client device.

Figure 4C:
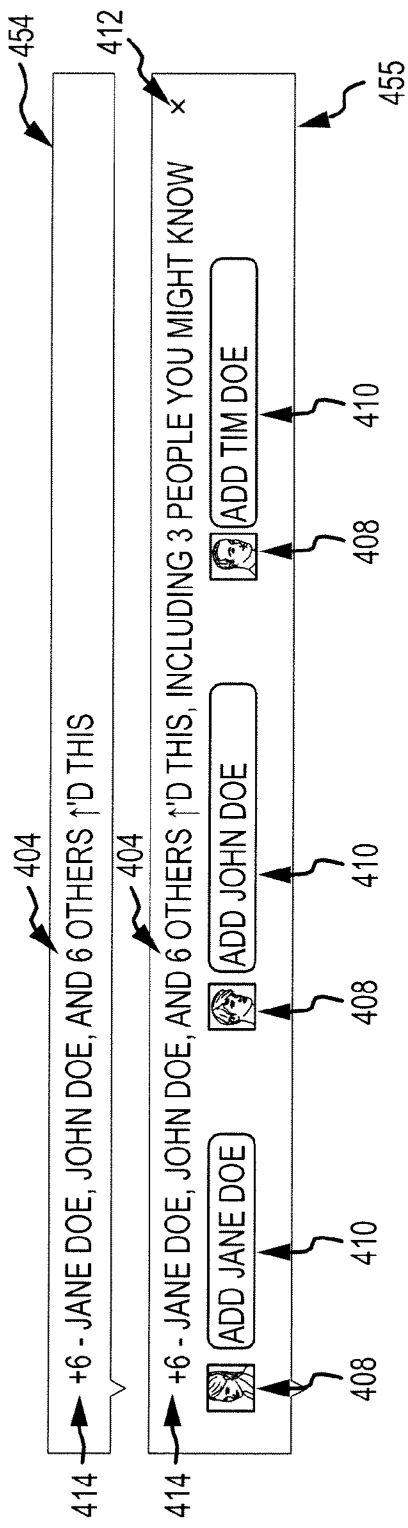

FIG. 4C illustrates two examples of two interactive elements (454 and 455) that are each based on an item recommended by one or more social network users within a user's social graph. Interactive element 454 contains a description of the item and/or an explanation on why the item was displayed in the activity stream 404 and a numerical representation of the number of user recommendations to the item 414. The description of the item shown in FIG. 4C includes names of one or more social network users within the user's social graph who recommended the item. Interactive element 455 also contains explanation 404 and numerical representation 414. Furthermore, interactive element 455 also contains graphical representations of one or more social network users outside of the user's social graph who recommended the item 408. The graphical representation may be a portrait, a profile picture, or any other image representing the source of the item. Alternative examples of this item may or may not include all of the above mentioned features. Furthermore, interactive element 455 also contains a user selectable control configured to allow adding of one or more social network users outside of the user's social graph 410, and removal of the item from the user's activity stream 412. Additional interactive elements that contain other types of context information about the item may also be generated and provided to the user's client device.

Figure 4D:
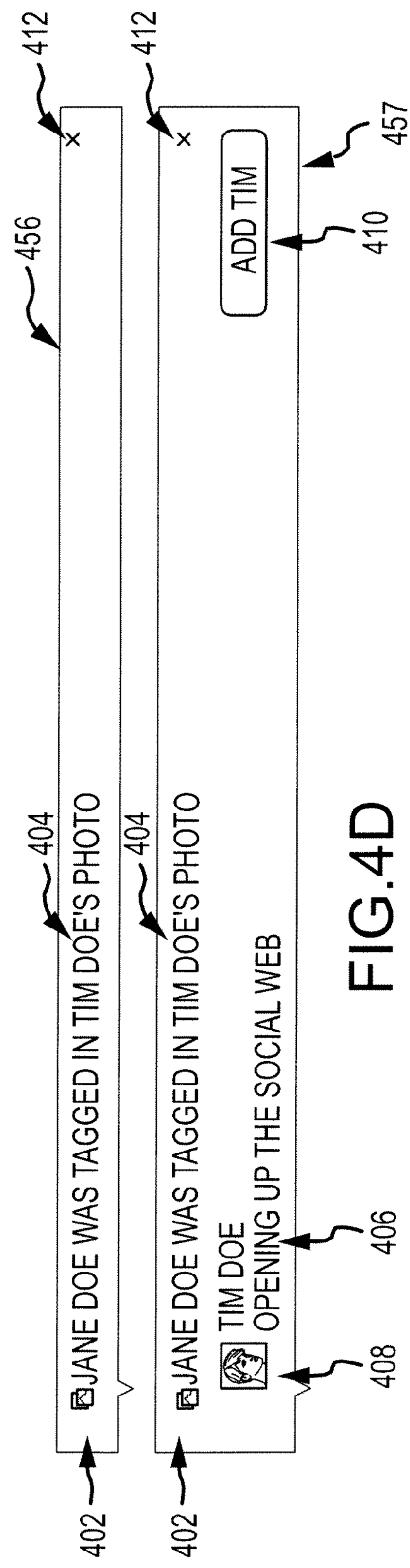

FIG. 4D illustrates two examples of interactive elements (456 and 457) that are based on a social network user outside of a user's social graph associating another social network user within the user's social graph with a photograph. Interactive element 456 contains an icon 402 representing the item associated with the interactive element and a description of the item and/or an explanation on why the item was displayed in the activity stream 404. Interactive element 457, in addition to containing icon 402 and explanation 404, also contains context information about the source of the item 406 and a graphical representation of the source of the item 408. The graphical representation may be a portrait, a profile picture, or any other image representing the source of the item. Alternative examples of this item may or may not include above mentioned features. Interactive element 457 also contains a user selectable control configured to allow adding the source of the item to the user's social network 410 and removal of the item from the user's activity stream 412.

Figure 4E:
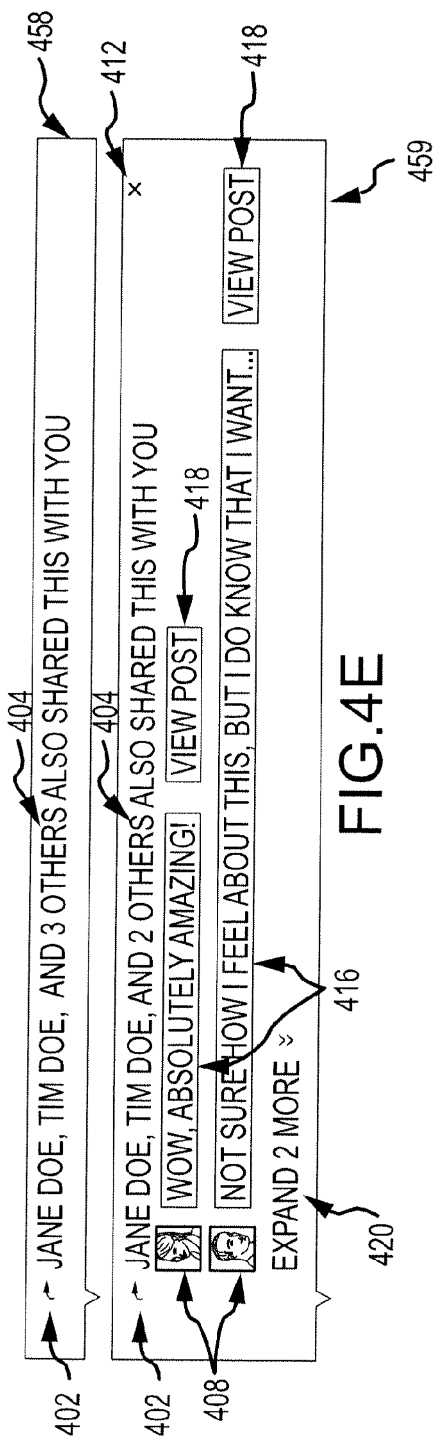

FIG. 4E illustrates two examples of interactive elements 458 and 459 that are based on one or more social network user activity posts, where, each individual post is recommended by one or more users within a user's social graph. Interactive element 458 contains an icon 402 representing the item associated with the interactive element and a description of the item and/or an explanation on why the item was displayed in the activity stream 404, e.g., the names of one or more social network users within the user's social graph who recommended the item to the user. Interactive element 459, in addition to containing icon 402 and explanation 404, also contains a graphical representation of that source 408. The graphical representation may be a portrait, a profile picture, or any other image representing the source of the item. Alternative examples of this item may or may not include all of the above mentioned features. Additional interactive elements that contain other types of context information about the item may also be generated and provided to the user's client device.

Interactive element 459 contains four user activity posts each with multiple user recommendations. Where a user activity post is recommended by multiple users, a single interactive element may be generated based on the multiple recommended activity posts. This item may also include any multiple of user activity posts recommended by any multiple of users.

Interactive element 459 also displays two network user activity summaries. The user selectable control may allow the two summaries 416 to separately expand 418 to provide additional context information about the corresponding activity post. This item may also include any multiple of user activity summaries which may be expanded to provide additional context information about the corresponding user activity post.

Interactive element 459 displays two of four user activity posts. The user may elect to expand 420 the list of user activity posts represented by interactive element 459 to view all of the user activity posts. Where multiple user activity posts are represented by a single interactive element, interactive element 459 may display some of the activity posts and provide a user option to expand the displayed posts 420 to allow display of all of the user activity posts. Alternative examples of this item may include any multiple of user activity posts displayed by a single interactive element where some of the user activity posts are displayed and an option to expand the displayed posts 420 to allow display of all of the user activity posts associated with interactive element 459 is provided. Interactive element 459 also contains a user selectable control configured to allow removal of the item from the user's activity stream 412.

Figure 4F:
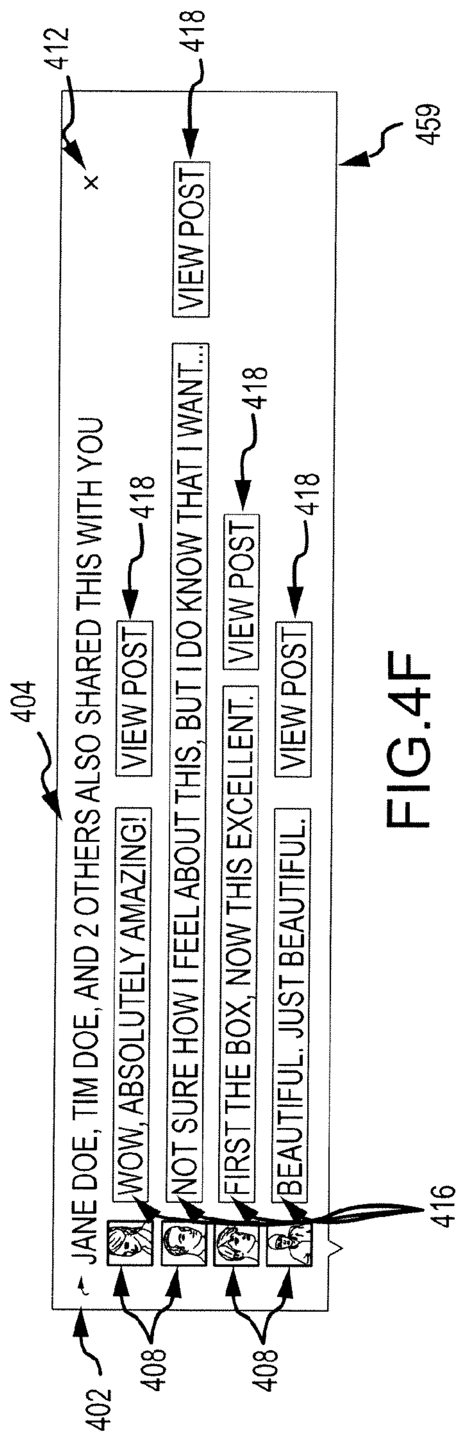

FIG. 4F illustrates an example of interactive element 459 represented by FIG. 4E where all four user activity posts are displayed. Interactive element 459 contains an icon 402 associated with the interactive element, a description of the item and/or an explanation on why the item was displayed in the activity stream 404, e.g., the names of one or more social network users within the user's social graph who recommended the item to the user, and a graphical representation of that source 408. The graphical representation may be a portrait, a profile picture, or any other image representing the source of the item. Alternative examples of this item may or may not include all of the above mentioned features.

Interactive element 459 also contains a user selectable control configured to allow removal of the item from the user's activity stream 412. Interactive element 459 displays four network user activity summaries 416. The user selectable control may allow the four summaries to separately expand to provide additional context information about corresponding activity posts. This item may include any multiple of summaries of corresponding user activity posts which may be expanded to provide additional context information about the corresponding user activity posts.

Figure 4G:
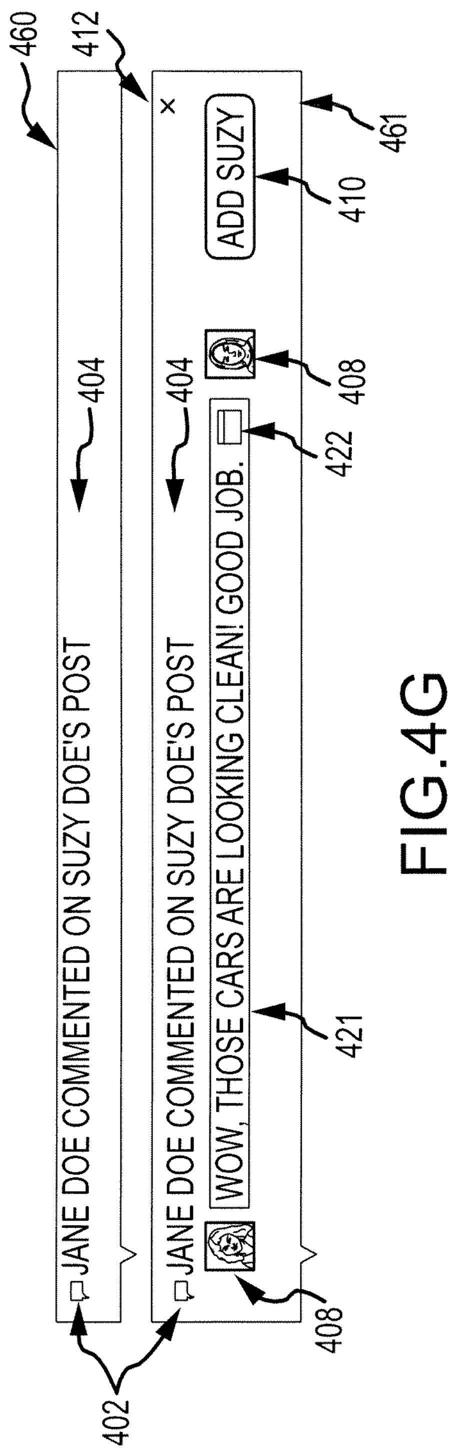

FIG. 4G illustrates two examples of interactive elements (460 and 461) that are based on a comment by a social network user within of a user's social graph regarding a social network user activity post by a social network user outside the user's social graph. Interactive element 460 contains an icon 402 associated with the interactive element and a description of the item and/or an explanation on why the item was displayed in the activity stream 404. Interactive element 461, in additional to containing icon 402 and explanation 404, also contains a graphical representation of the social network user who made the comment 408 and a graphical representation of the source of the user activity post 408. These graphical representations may be a portrait, a profile picture, or any other image representing the source of the item. Interactive element 461 also includes the text of the comment 421. Alternative examples of this item may or may not include all of the above mentioned features. Interactive element 461 is also configured to allow adding the source of the user activity post to the user's social graph 410, removal of the item from the user's activity stream 412, and recommending the comment made by the social network user within user's social graph 422. Additional interactive elements that contain other types of context information about the item may also be generated and provided to the user's client device.

Figure 4H:
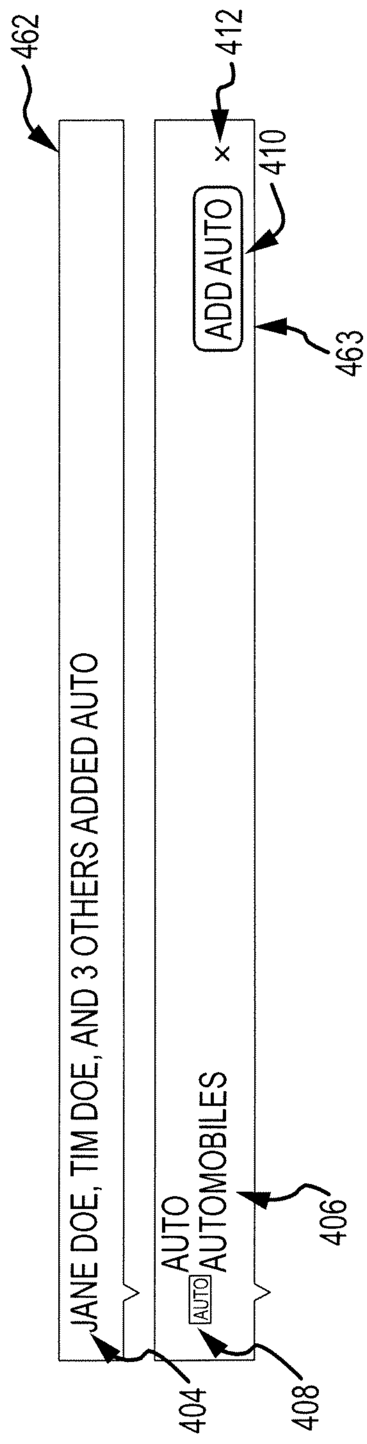

FIG. 4H illustrates two examples of interactive elements (462 and 463) that are based on one or more social network users adding a social network user or a social network page to their network. Interactive element 462 contains a description of the item and/or an explanation on why the item was displayed in the activity stream 404. The description may also include names of one or more social network users within a user's social graph who added the social network user or social network page and an numerical representation proportional to the number of social network users within the user's social graph who added the social network user or social network page. Interactive element 462, in addition to containing explanation 404, also contains context information about the source of the item 406 and a graphical representation of the source of the item 408. The graphical representation may be a portrait, a profile picture, or any other image representing the source of the item. Alternative examples of this item may or may not include all of the above mentioned features. Interactive element 462 also contains a user selectable control configured to allow adding of the social network page outside of the user's social graph 410, and removal of the item from the user's activity stream 412. Additional interactive elements that contain other types of context information about the item may also be generated and provided to the user's client device.

Figure 4I:
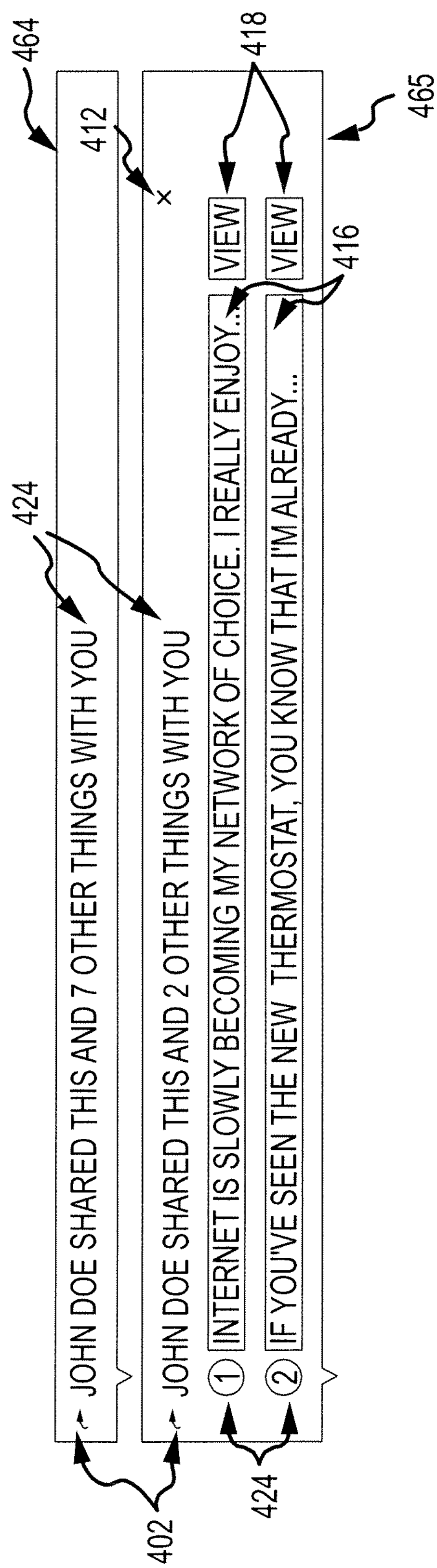

FIG. 4I illustrates two examples of an interactive element (464 and 465) that are based on multiple news activity posts shared by a single social network user within a user's social graph. Interactive element 464 contains an icon 402 associated with the interactive element and a description of the item and/or an explanation on why the item was displayed in the activity stream 424. Alternative examples of this item may or may not include all of the above mentioned features. Interactive element 465, in addition to containing icon 402 and explanation 424, also contains two activity summaries 416 shared by a single user. Where a social network user within the user's social graph shares multiple network activity posts, a single interactive element may be generated based on the multiple activity posts. This item may also include any multiple of activity posts by a single social network user within the user's social graph with a separate summary for each particular activity post by the single social network user.

The user selectable control may allow separate expansions 418 of the two activity summaries 416 to provide additional context information about the user activity posts. Where multiple user activity posts are represented by interactive element 465, a numerical representation 424 identifying the activity post with respect to the other activity posts may also be provided. Alternative examples of this item may contain multiple activity posts 421, some of which are displayed, and a user selectable control configured to provide the user an option to expand to allow the display of all of the user activity posts 420. Interactive element 465 also contains a user selectable control configured to allow removal of the item from the user's activity stream 412. Additional interactive elements that contain other types of context information about the item may also be generated and provided to the user's client device.

Figure 5:
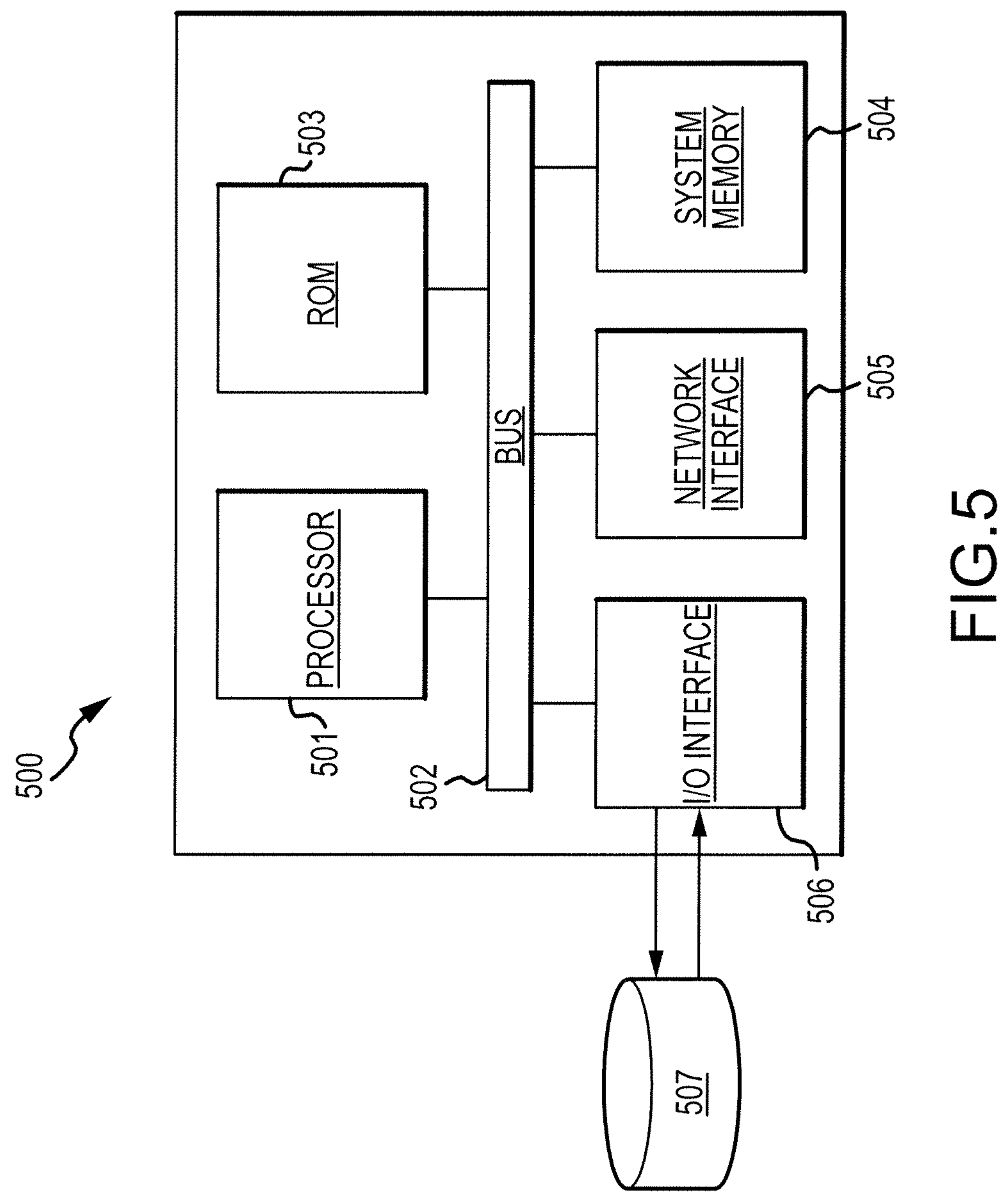
FIG. 5 illustrates an example system including a processor and other internal compartments for supplementing items for display in an activity stream, in accordance with various aspects of the subject technology.

FIG. 5 illustrates an example system including a processor and other internal compartments for supplementing items for display in an activity stream. In some aspects, a computerized device 500 (e.g., a client device 102, 104, or 106, a server 108, or the like) includes several internal components, for example, a processor, a system bus 502, read-only memory 503, system memory 504, network interface 505, I/O interface 506, and the like. In one aspect, processor 501 may also be communication with a storage medium 507 (e.g., a hard drive, database, or data cloud) via I/O interface 506. In some aspects, all of these elements of device 500 may be integrated into a single device. In other aspects, these elements may be configured as separate components.

Processor 501 may be configured to execute code or instructions to perform the operations and functionality described herein, manage request flow and address mappings, and to perform calculations and generate commands. Processor 501 may determine and control the operation of the components in server 500. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 501. Likewise, one or more sequences of instructions may be software stored and read from system memory 505, ROM 503, or received from a storage medium 507 (e.g., via I/O interface 506). ROM 503, system memory 505, and storage medium 507 represent examples of machine or computer readable media on which instructions/code may be executable by processor 501. Machine or computer readable media may generally refer to any medium or media used to provide instructions to processor 501, including both volatile media, for example, dynamic memory used for system memory 504 or for buffers within processor 501, and non-volatile media, for example, electronic media, optical media, and magnetic media.

Processor 501 may communicate with one or more external devices (e.g., via I/O interface 506). Processor 501 is further configured to read data stored in system memory 504 and/or storage medium 507 and to transfer the read data to the one or more external devices in response to a request from the one or more external devices. The read data may include one or more web pages and/or other software presentation to be rendered on the one or more external devices. The one or more external devices may include a client device, for example, a personal computer, a server, a workstation, a laptop computer, PDAs, smart phone, and the like.

In some aspects, system memory 504 represents volatile memory used to temporarily store data and information used to manage device 500. According to one aspect of the subject technology, system memory 504 is random access memory (RAM) e.g., double data rate (DDR) RAM. Other types of RAM also may be used to implement system memory 504. Memory 504 may be implemented using a single RAM module or multiple RAM modules. While system memory 504 is depicted as being part of device 500, those skilled in the art will recognize that system memory 504 may be separate from device 500 without departing from the scope of the subject technology. Alternatively, system memory 504 may be a non-volatile memory, for example, a magnetic disk, flash memory, peripheral SSD, and the like.

I/O interface 506 may be configured to be coupled to one or more external devices, to receive data from the one or more external devices and to send data to the one or more external devices. I/O interface 506 may include both electrical and physical connections for operably coupling I/O interface 506 to processor 501, (e.g., via the bus 502). I/O interface 506 is configured to communicate data, addresses, and control signals between the internal components attached to bus 502 (e.g., processor 501) and one or more external devices (e.g., a hard drive). I/O interface 506 may be configured to implement a standard interface, for example, Serial-Attached SCSI (SAS), Fiber Channel interface, PCI Express (PCIe), SATA, USB, and the like. I/O interface 506 may be configured to implement only one interface. Alternatively, I/O interface 506 may be configured to implement multiple interfaces, which are individually selectable using a configuration parameter selected by a user or programmed at the time of assembly. I/O interface 506 may include one or more buffers for buffering transmissions between one or more external devices and bus 502 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

An "aspect" does not imply that such aspect is essential to the subject technology or that such aspect applies to all configurations of the subject technology. A disclosure relating to an aspect may apply to all configurations, or one or more configurations. An aspect may provide one or more examples. An aspect may refer to one or more aspects and vice versa. An "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. An "embodiment" may refer to one or more embodiments and vice versa. A "configuration" does not imply that such configuration is essential to the subject technology or that such configuration applies to all configurations of the subject technology. A disclosure relating to a configuration may apply to all configurations, or one or more configurations. A configuration may provide one or more examples. A "configuration" may refer to one or more configurations and vice versa.

What is claimed is:

1. A computer-implemented method comprising:

providing an unsubscribed item for display in an activity stream associated with a user of a client device, the unsubscribed item being associated with a source outside of a social graph of the user, the unsubscribed item being provided based on a number of interactions between the user and other items associated with the source exceeding a threshold number of interactions;

generating an interactive element based on a type of the client device, the interactive element comprising context information about the unsubscribed item, the interactive element configured to expand from a contracted state to an expanded state in response to a user action and to provide additional context information;

varying an amount of the context information based on the type of the client device;

arranging a user selectable control within the interactive element based on a type of the unsubscribed item, the user selectable control configured to initiate a response to the unsubscribed item, the interactive element configured to display the user selectable control in the expanded state, the type of the unsubscribed item comprising a news post, an image, a video, or a social network user activity post; and providing the interactive element for display in association with the unsubscribed item in the activity stream on the client device.

2. The computer-implemented method of claim 1, wherein the context information comprises information about a source of the unsubscribed item.

3. The computer-implemented method of claim 1, wherein the context information comprises a summary of social network activity related to the unsubscribed item.

4. The computer-implemented method of claim 1, wherein the context information comprises social network user comments about the unsubscribed item.

5. The computer-implemented method of claim 1, wherein the response to the unsubscribed item comprises adding a source of the unsubscribed item to a user's social network.

6. The computer-implemented method of claim 1, wherein the response to the unsubscribed item comprises sharing the unsubscribed item with another social network user.

7. The computer-implemented method of claim 1, wherein the response to the unsubscribed item comprises removing the unsubscribed item from the activity stream.

8. The computer-implemented method of claim 1, wherein the type of the client device comprises a mobile device or a desktop computer.

9. The computer-implemented method of claim 1, wherein:

a plurality of items is provided for display in the activity stream, a plurality of interactive elements is generated for display in association with the plurality of items, respectively, and the plurality of interactive elements is provided for display in association with the plurality of items in the activity stream.

10. The computer-implemented method of claim 1, wherein the context information includes an explanation on why the unsubscribed item was provided for display in the activity stream.

11. A non-transitory machine-readable medium storing machine-executable instructions, which when executed by a processor, cause the processor to perform operations comprising:

providing an unsubscribed item for display in an activity stream associated with a user of a client device, the unsubscribed item being associated with a source outside of a social graph of the user, the unsubscribed item being provided based on a number of interactions between the user and other items associated with the source exceeding a threshold number of interactions;

determining a type of the client device on which the activity stream is displayed;

generating an interactive element based on the type of the client device, the interactive element comprising context information about the unsubscribed item, the interactive element configured to expand from a contracted state to an expanded state in response to a user action and to provide additional context information;

varying an amount of the context information based on the type of the client device;

arranging a user selectable control within the interactive element based on a type of the unsubscribed item, the user selectable control configured to initiate a response to the unsubscribed item, the interactive element configured to display the user selectable control in the expanded state, the type of the unsubscribed item comprising a news post, an image, a video, or a social network user activity post; and providing the interactive element for display in association with the unsubscribed item in the activity stream on the client device.

12. The non-transitory machine-readable medium of claim 11, wherein the context information comprises information about a source of the unsubscribed item.

13. The non-transitory machine-readable medium of claim 11, wherein the context information comprises a summary of social network activity related to the unsubscribed item.

14. The non-transitory machine-readable medium of claim 11, wherein the context information comprises social network user comments about the unsubscribed item.

15. The non-transitory machine-readable medium of claim 11, wherein the response to the unsubscribed item comprises adding a source of the unsubscribed item to a user's social network.

16. The non-transitory machine-readable medium of claim 11, wherein the response to the unsubscribed item comprises sharing the unsubscribed item with another social network user.

17. The non-transitory machine-readable medium of claim 11, wherein the response to the unsubscribed item comprises removing the unsubscribed item from the activity stream.

18. A system comprising:

a memory storing executable instructions; and one or more processors configured to execute the executable instructions stored in the memory, which when executed by the processors, cause the processors to perform operations comprising:

providing an unsubscribed item for display in an activity stream associated with a user of a client device, the unsubscribed item being associated with a source outside of a social graph of the user, the unsubscribed item being provided based on a number of interactions between the user and other items associated with the source exceeding a threshold number of interactions;

generating an interactive element based on a type of the client device, the interactive element comprising context information about the unsubscribed item, the interactive element configured to expand from a contracted state to an expanded state in response to a user action and to provide additional context information;

varying an amount of the context information based on the type of the client device;

arranging a user selectable control within the interactive element based on a type of the unsubscribed item, the user selectable control configured to initiate a response to the unsubscribed item, the interactive element configured to display the user selectable control in the expanded state, the type of the unsubscribed item comprising a news post, an image, a video, or a social network user activity post; and providing the interactive element for display in association with the unsubscribed item in the activity stream on the client device.

* * * * *